US009682678B2

United States Patent
Rose et al.

(10) Patent No.: US 9,682,678 B2
(45) Date of Patent: Jun. 20, 2017

(54) AIRBAG CUSHION PROTECTORS AND RELATED METHODS

(71) Applicant: Autoliv ASP, Inc., Ogden, UT (US)

(72) Inventors: Larry D. Rose, South Weber, UT (US); Randy K. Stuart, North Logan, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 2 days.

(21) Appl. No.: 14/930,567

(22) Filed: Nov. 2, 2015

(65) Prior Publication Data
US 2017/0120853 A1 May 4, 2017

(51) Int. Cl.
*B60R 21/215* (2011.01)
*B60R 21/2342* (2011.01)

(52) U.S. Cl.
CPC ........ *B60R 21/215* (2013.01); *B60R 21/2342* (2013.01); *B60R 2021/21531* (2013.01)

(58) Field of Classification Search
CPC .............. B60R 21/215; B60R 21/2342; B60R 2021/21531
See application file for complete search history.

(56) References Cited

U.S. PATENT DOCUMENTS

| | | | | |
|---|---|---|---|---|
| 5,765,867 A * | 6/1998 | French | ..................... | B60R 21/16 280/743.1 |
| 5,899,495 A * | 5/1999 | Yamamoto | .......... | B60R 21/2342 280/743.1 |
| 6,070,904 A * | 6/2000 | Ozaki | ..................... | B60R 21/16 280/728.1 |
| 6,099,026 A * | 8/2000 | Ando | .................... | B60R 21/201 280/728.1 |
| 6,371,510 B1 * | 4/2002 | Marriott | ................ | B60R 21/201 280/730.1 |
| 6,874,810 B2 | 4/2005 | Soderquist | | |
| 7,314,228 B2 * | 1/2008 | Ishiguro | ................ | B60R 21/201 280/728.1 |

(Continued)

FOREIGN PATENT DOCUMENTS

| | | |
|---|---|---|
| DE | 19824735 | 12/1999 |
| EP | 2062790 | 5/2009 |
| WO | WO9816410 | 4/1998 |

OTHER PUBLICATIONS

Concise Explanation of Relevance of DE19824735.

*Primary Examiner* — Darlene P Condra
(74) *Attorney, Agent, or Firm* — Phillips Ryther & Winchester; Matthew D. Thyane (57) ABSTRACT

Airbag cushion assemblies comprising cushion protective structures and related methods of assembly. Some embodiments may comprise an airbag cushion and a protector or protective structure, such as a protective wrapper, comprising a first portion and a second portion. The first portion may be wrapped around the airbag cushion, and the second portion may be positioned adjacent to a deployment side of the airbag cushion such that the protective wrapper is configured to expand upon deployment of the airbag cushion so as to define a pocket for protecting the airbag cushion during deployment. In some embodiments, the pocket may be configured to enclose the airbag cushion about an entire perimeter of the airbag cushion during deployment.

19 Claims, 7 Drawing Sheets

(56) References Cited

U.S. PATENT DOCUMENTS

| | | | |
|---|---|---|---|
| 7,597,343 B2* | 10/2009 | Miwa | B60R 21/20 280/728.2 |
| 7,631,894 B2* | 12/2009 | Hasebe | B60R 21/201 280/743.2 |
| 7,695,013 B2* | 4/2010 | Kakstis | B60R 21/20 280/743.1 |
| 7,845,683 B2* | 12/2010 | Sato | B60R 21/201 280/743.2 |
| 8,231,140 B2* | 7/2012 | Maripudi | B60R 21/201 280/740 |
| 8,272,664 B2 | 9/2012 | Benny et al. | |
| 2003/0189319 A1* | 10/2003 | Soderquist | B60R 21/201 280/728.3 |
| 2003/0234520 A1 | 12/2003 | Hawthorn et al. | |
| 2004/0195808 A1* | 10/2004 | Amamori | B60R 21/201 280/728.2 |
| 2005/0001410 A1* | 1/2005 | Evans | B60R 21/2165 280/728.3 |
| 2007/0164541 A1 | 7/2007 | Soderquist et al. | |
| 2008/0217887 A1 | 9/2008 | Seymour et al. | |
| 2009/0152842 A1* | 6/2009 | Benny | B60R 21/201 280/728.3 |
| 2010/0066059 A1* | 3/2010 | Klinkenberger | B60R 21/231 280/728.1 |
| 2010/0301589 A1* | 12/2010 | Daita | B60R 21/215 280/728.3 |
| 2011/0088356 A1 | 4/2011 | Lachat et al. | |
| 2014/0070521 A1* | 3/2014 | Funakura | B60R 21/20 280/728.3 |

\* cited by examiner

AIRBAG CUSHION PROTECTORS AND RELATED METHODS

SUMMARY

Many airbag cushions, and particularly most passenger-side airbag cushions, require that the cushion extend through a deployment chute, which may be located within an instrument panel, during deployment. There are often many features of the deployment chute that may be sharp or may otherwise be a threat to damaging the fabric structure of the cushion. For example, edges and/or corners of the instrument panel defining the deployment chute and/or doors enclosing the deployment chute may damage the cushion during airbag deployment.

Although some solutions to this problem have been presented, they fail to provide adequate protection around a full perimeter of the airbag cushion. For example, many such proposed solutions fail to provide protection on the corners and/or edges of chute doors and/or other structures defining the deployment chute.

The present inventors have therefore determined that it would be desirable to provide systems and methods that overcome one or more of the foregoing limitations and/or other limitations of the prior art. For example, the present inventors have determined that, by providing, in some embodiments, a protective structure that provides full perimeter protection during airbag deployment, damage to airbag cushions during deployment may be reduced or eliminated. In some embodiments, the protective structure may be configured to extend out of the deployment chute before or along with the cushion to serve as a barrier to prevent direct contact with various features of a vehicle defining an airbag deployment chute. In some embodiments, the protective structure may comprise a wrapper that wraps around the airbag cushion such that the wrapper can be installed within an airbag module or assembly.

In a more particular example of an airbag cushion assembly according to some embodiments, the assembly may comprise an airbag cushion and a protective wrapper comprising a first portion and a second portion. In some embodiments, the protective wrapper may comprise a unitary piece such that the first portion and the second portion are defined from a single piece of material.

The first portion may be wrapped around the airbag cushion, and the second portion may be positioned adjacent to a deployment side of the airbag cushion. The protective wrapper may be configured to expand upon deployment of the airbag cushion so as to define a pocket for protecting the airbag cushion during deployment. The pocket may be configured to surround or enclose the airbag cushion about an entire perimeter of the airbag cushion during initial deployment. In some embodiments, the pocket may be configured to extend out of a deployment chute so as to lay down a protective barrier before or simultaneously with the airbag cushion.

In some embodiments, the second portion of the protective wrapper may be folded adjacent to the airbag cushion, and may be configured to unfold during deployment of the airbag cushion to define the pocket. In some embodiments, the second portion of the protective wrapper may comprise a tear seam configured to sever upon deployment of the airbag cushion to allow the second portion to unfold.

In some embodiments, the protective wrapper may further comprise one or more notches, such as opposing notches. Such notches may be formed in the second portion. The notch(es) may be configured to facilitate tearing of the protective wrapper adjacent to the opposing notches during deployment. In some embodiments, the opposing notches may comprise v-shaped notches or u-shaped notches. In some embodiments, the protective wrapper may comprise slits to facilitate tearing and/or other desired deployment characteristics.

In a particular example of a vehicle according to certain preferred embodiments, the vehicle may comprise an airbag deployment chute, at least one door covering the airbag deployment chute, and an airbag cushion assembly positioned within the airbag deployment chute. The airbag cushion assembly may comprise an airbag cushion and an airbag cushion protector, such as a wrapper, coupled with the airbag cushion. The airbag cushion protector may be configured to expand upon deployment of the airbag cushion so as to define a pocket for protecting the airbag cushion during deployment, and the pocket may be configured to enclose the airbag cushion protector about an entire perimeter of the airbag cushion to prevent direct contact between the airbag cushion and the at least one door.

In some embodiments, the pocket may be further configured to prevent direct contact between the airbag cushion and any portion of a perimeter of the airbag deployment chute during deployment. In some embodiments, the pocket may comprise a closed loop that defines an opening through which the airbag cushion can extend during deployment. The closed loop may be configured to prevent direct contact between the airbag cushion and any portion of a perimeter of the airbag deployment chute during deployment.

In some embodiments, the airbag cushion protector may be configured to expand during deployment by unfolding.

In some embodiments, the airbag cushion protector may comprise a first portion and a second portion. The first portion may be wrapped around the airbag cushion, and the second portion may be positioned adjacent to a deployment side of the airbag cushion such that the airbag cushion can extend through the second portion during deployment.

In some embodiments, the airbag cushion protector comprises at least one cut configured to facilitate tearing of the airbag cushion protector adjacent to the at least one cut during deployment of the airbag cushion. In some embodiments, the airbag cushion protector may comprise opposing cuts formed on opposite sides of a tubular structure formed during an assembly process of the protector. In some embodiments, the cut(s) may comprise notch(es). In some embodiments, the cut(s) may extend along no more than about half of a height of the second portion from a perimeter of the pocket to a perimeter of the airbag deployment chute and/or a portion of the pocket configured to exit the deployment chute.

In an example of a particular method for assembly of an airbag cushion assembly according to some implementations, the method may comprise coupling opposing portions of a protective wrapper together to define a tubular structure and then folding a first end of the tubular structure to create a layered portion. The layered portion may be configured to open during deployment of an associated airbag cushion to define a pocket for protecting the airbag cushion. The assembly process may further comprise positioning the airbag cushion adjacent to the layered portion and coupling the airbag cushion to the protective wrapper. In some implementations, the step of coupling the airbag cushion to the protective wrapper may comprise wrapping the protective wrapper around the airbag cushion and/or securing the protective wrapper to the airbag cushion. Securing the protective wrapper to the airbag cushion may be done using one or more flaps, which may comprise fastener openings configured to receive bolts or other fasteners of, for example, an inflator and/or housing. In some embodiments, the wrapper or protector may be sewn directly to the airbag cushion.

Some implementations may further comprise forming at least one pleat along the tubular structure. In some such implementations, this step may be performed prior to the step of folding a first end of the tubular structure to create a layered portion. In some implementations, the step of forming at least one pleat along the tubular structure may comprise forming a first pleat along a first side of the tubular structure; and forming a second pleat along a second side of the tubular structure opposite from the first side.

Some implementations may further comprise forming a breakaway stitch to the layered portion, wherein the breakaway stitch is configured to open to expose the airbag cushion to the tubular structure during deployment of the airbag cushion.

In some implementations, the pocket may be configured to extend about an entire perimeter of the airbag cushion to prevent direct contact between the airbag cushion and a perimeter of an airbag deployment chute during deployment of the airbag cushion.

Some implementations may further comprise forming one or more notches that are configured to facilitate separation of the protective wrapper adjacent to the opposing notches during deployment of the airbag cushion. In some such implementations, opposing notches may be formed along one end of the tubular structure.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Apparatus, methods, and systems are disclosed herein relating to protective structures for airbag cushions. More particularly, in some embodiments and implementations, a wrapper or another similar protector may be provided that may serve to protect an airbag cushion during airbag deployment by providing a full perimeter barrier to prevent direct contact between the airbag cushion and most or all of a structure defining a chute for deployment of the airbag cushion, in some cases including edges and/or corners of various doors that may be used to enclose such a chute.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
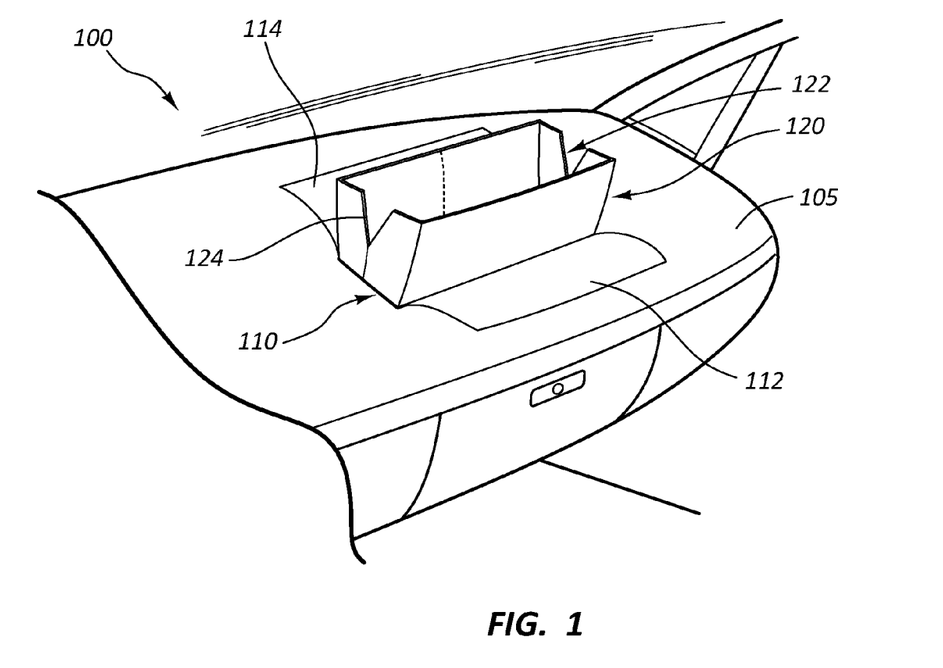
FIG. 1 is a partial, perspective view of a vehicle instrument panel having an airbag cushion protector according to some embodiments.

FIG. 1 depicts a portion of a vehicle 100 having an airbag cushion protector 120 according to some embodiments. For purposes of illustration, airbag cushion protector 120 is depicted without an accompanying airbag cushion. However, it will be understood after review of this disclosure that airbag cushion protector 120 would normally be coupled to an airbag cushion such that airbag cushion protector 120 may serve to protect the airbag cushion during an airbag deployment, as discussed in greater detail below.

Airbag cushion protector 120 is depicted in FIG. 1 extending from an airbag deployment chute 110 formed in an instrument panel 105. Doors 112 and 114 are shown in an opened position to expose airbag deployment chute 110. The configuration depicted in FIG. 1 corresponds with an initial stage during an airbag deployment. As shown in this figure, airbag cushion protector 120 comprises opposing notches 122 and 124. As described in greater detail below, notches 122 and 124 may be configured to facilitate tearing or separation of airbag cushion protector 120 at desired locations during deployment. In the depicted embodiment, notches 122 and 124 comprise v-shaped notches. However, as discussed below, other embodiments are contemplated in which such notches may have a different shape, may instead comprise slits, or may be omitted altogether.

As also shown in FIG. 1, airbag cushion protector 120 defines a pocket for protecting an associated airbag cushion during deployment. This pocket is configured to enclose the airbag cushion about an entire perimeter of the airbag cushion during initial deployment of the airbag cushion. Thus, this pocket may define a closed loop through which the airbag cushion may deploy, such that the closed loop extends about a full perimeter of at least a portion of the airbag cushion as it extends through an opening, such as a deployment chute, to provide full perimeter protection from adjacent edges and corners of the opening.

In addition, it can be seen in FIG. 1 that notches 122 and 124 do not extend all the way to airbag deployment chute 110. Instead, notches 122 and 124 extend only about half way between the top of the perimeter of airbag cushion protector 120 and the portion of airbag cushion protector 120 that is immediately adjacent to airbag deployment chute 110. This configuration may provide more complete protection to an associated airbag cushion than would otherwise be possible.

Figure 2:
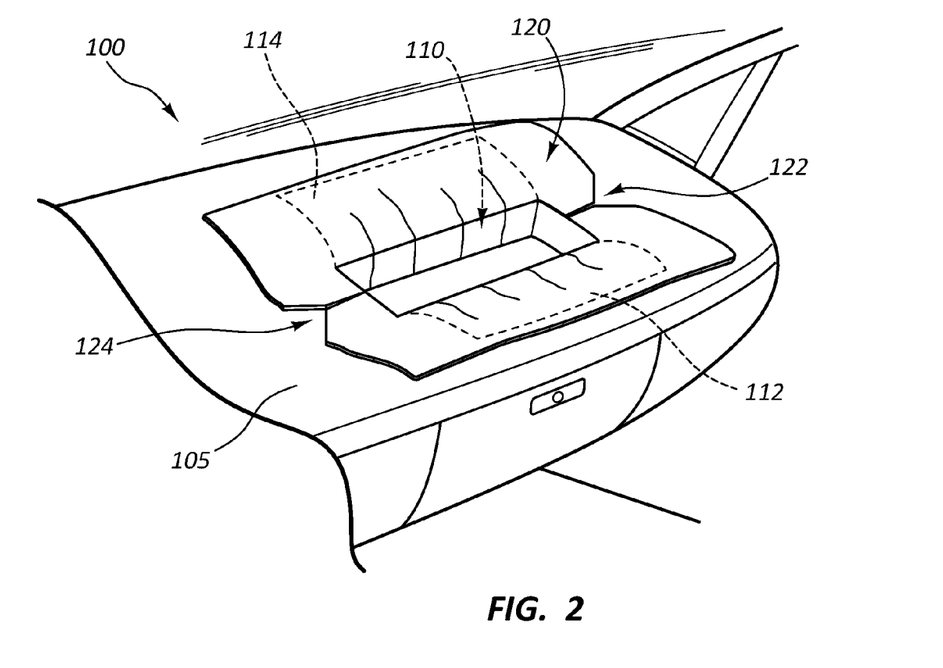
FIG. 2 is a partial, perspective view of the airbag cushion protector of FIG. 1 following deployment of an airbag cushion.

FIG. 2 depicts airbag cushion protector 120 during a later stage of deployment of an airbag cushion. As shown in this figure, airbag cushion protector 120 is configured to prevent direct contact between the airbag cushion and any portion of a perimeter of the airbag deployment chute 110, including edges and corners of doors 112 and 114, along with edges and corners of the remainder of the perimeter of airbag deployment chute 110, during deployment. By providing a barrier around a full perimeter of the airbag cushion, airbag cushion protector 120 may advantageously prevent damage to the cushion that may otherwise occur.

FIGS. 3-7 are plan views of an airbag cushion protector 120 according to some embodiments during various stages of a method of assembly according to some implementations.

Figure 3:
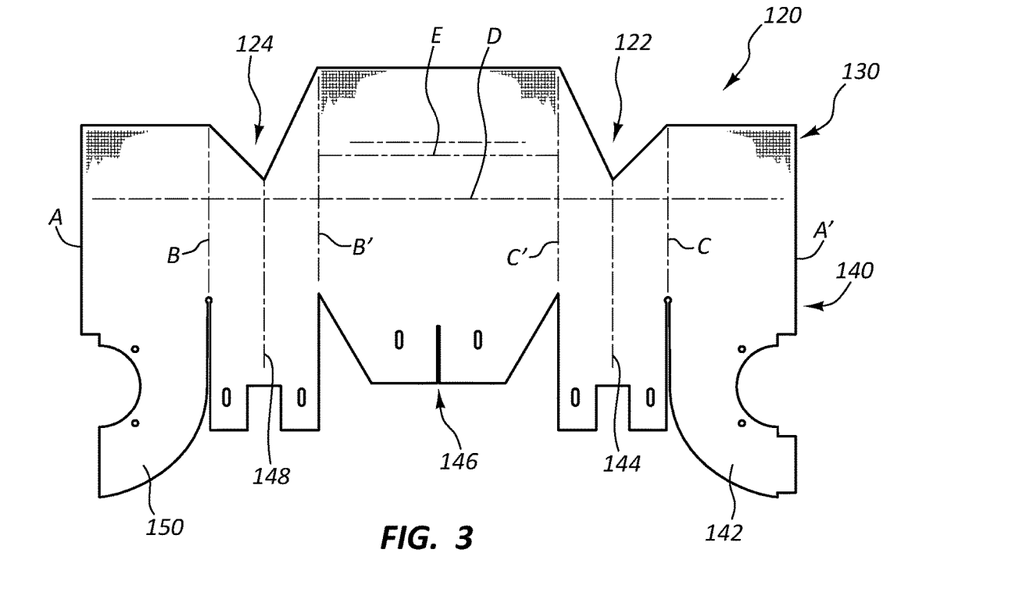
FIGS. 3-7 are plan views of an airbag cushion protector according to some embodiments during various stages of a method of assembly according to some implementations.

In FIG. 3, airbag cushion protector 120 is shown comprising a unitary piece of material in a desired pattern. In a preferred embodiment, the material used to make protector 120 may comprise a woven, nylon fabric. In some embodiments, the woven nylon may comprise a coating, such as a silicone coating. However, alternative embodiments are contemplated in which protector 120 may instead comprise, for example, a woven polyester, either with or without a coating, or a non-woven material with nylon or polyester added to a base material as a randomly-oriented in-layed support structure. A specific example of a suitable material comprising a non-woven material comprising spunbond olefin fibers is Tyvek™.

Protector 120 is depicted in FIG. 3 laid flat to prepare for assembly. As shown in this figure, protector 120 may include various desired features to facilitate assembly and/or to provide for desired protective functions during deployment of an accompanying airbag cushion. For example, protector 120 comprises a first inflator flap 142 and a second inflator flap 150. Flaps 142 and 150 may be coupled together to collectively define an opening for an airbag inflator, as discussed in greater detail below.

Additional flaps may be provided, such as flaps 144, 146, and 148. Flaps 144 and 148 may be used to couple protector 120 with an airbag cushion and/or an airbag housing or module, as also discussed below. Similarly, flap 146 may be configured to couple protector 120 with an airbag cushion and/or an airbag housing or module. In the depicted embodiment, flap 146 will ultimately be configured to extend at least substantially perpendicularly relative to flaps 144 and 148, both of which will be configured to extend towards one another.

Various bolt/fastener openings may be provided in desired locations on the various flaps to further facilitate coupling with an airbag cushion and/or an airbag housing or module. In addition, notches 122 and 124 may be formed along an upper portion of the pattern of protector 120. In the depicted embodiment, notches 122/124 comprise a v shape at the bottom, which may facilitate tearing of protector 120 adjacent to the apex of the v shape. However, other shapes are contemplated, as discussed below. Moreover, in the embodiment depicted in FIG. 3, the shape may comprise more of a U shape along the sides but with a sharped, rather than rounded, apex.

The pattern of protector 120 may further comprise various lines or features that may assist an assembler in an assembly process. These features are also useful for purposes of illustrating some of the steps in this process. For example, opposite ends of the pattern are labelled with A and A', respectively. Similarly, fold lines may be defined at opposing ends of flap 148, as shown at B and B', and at opposing ends of flap 144, as shown at C and C'. The purpose for these fold lines will be described below in connection with a later step.

A perpendicular fold line D may extend all the way across protector 120 from side A to side A'. As described in greater detail below, line D may delineate a border between two distinct functional portions of protector 120. More particularly, the portion of protector 120 above line D (from the perspective of FIG. 3) may comprise an "upper portion" 130 of the finished protector 120. As discussed below, this upper portion may be positioned adjacent to a deployment side of the accompanying airbag cushion such that the upper portion of the protector 120 unfolds upon deployment of the airbag cushion so as to define a pocket for protecting the airbag cushion during deployment.

Similarly, the portion of the protector 120 below line D may comprise a "lower portion" 140, which portion may be wrapped around the airbag cushion and may serve to allow the protector 120 to be coupled to the airbag cushion, a housing, and/or an airbag module. Another fold line E may be used to delineate a desired folding location for a subsequent step in the assembly process, as discussed below.

Figure 4:
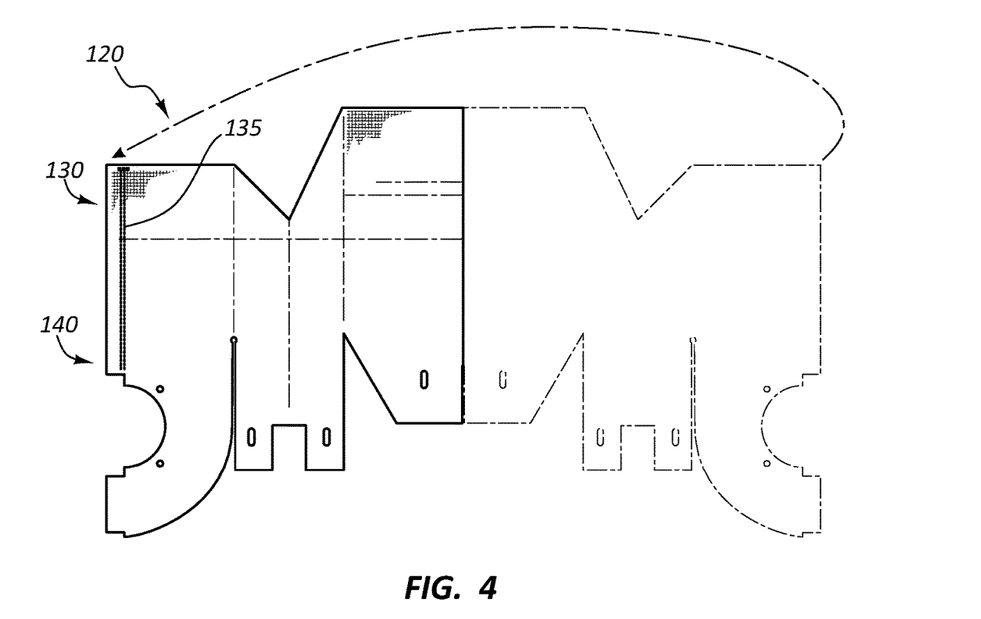

FIG. 4 depicts a second step in the assembly process. In this step, sides A and A' are coupled together, or at least are coupled relatively close to one another, such that protector 120 defines a tubular structure. In the depicted embodiment, a permanent sew line 135 may be used to couple sides A and A' together. However, in other embodiments, other means for coupling may be used, such as adhesives, tacks, etc. In the assembled protector, this tubular structure may extend about an entire perimeter of the accompanying airbag cushion and serve as a protective barrier around an entire perimeter of an airbag deployment chute to prevent contact with various edges, corners, etc. of the chute and doors associated with the chute.

Figure 5:
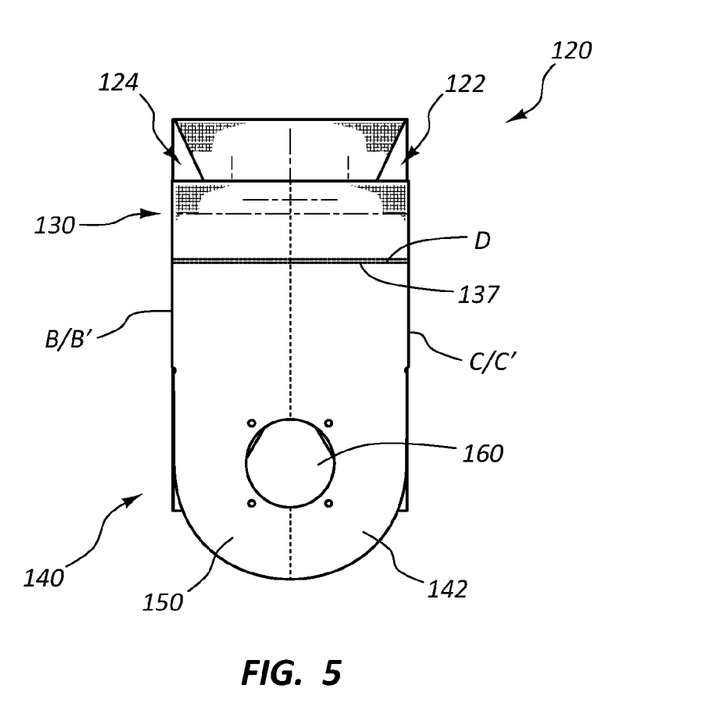

Following the step depicted in FIG. 4, the tubular structure may be inverted or turned inside out. In embodiments comprising a sew line 135, this means the sew line 135 will be on the inside of the tubular structure. FIG. 5 depicts protector 120 following this inversion step. In addition, pleats have been formed in opposite sides of the tubular structure of protector 120 such that the structure can again be laid flat. More particularly, these pleats have been formed by aligning lines B and B', and similarly aligning lines C and C' on the opposite end of the tubular structure.

In addition, as also depicted in FIG. 5, in some embodiments and implementations, a sew line 137 may be applied along or adjacent to line D to close the tubular structure. Preferably, sew line 137 comprises a breakaway or tack sew to allow the sew to come loose during deployment of the airbag cushion and re-open the tubular structure.

Figure 6:
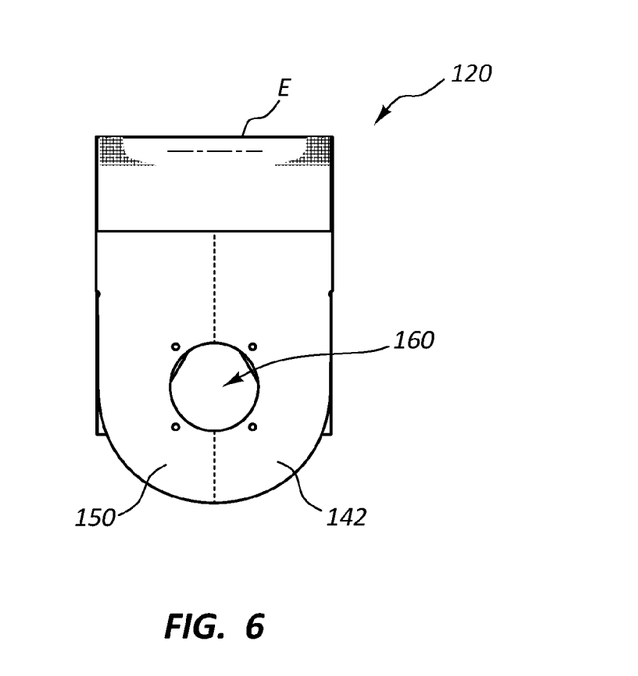

Following the step depicted in FIG. 5, the end opposite from the end at which opening 160 is located may be folded over at or near line E, as depicted in FIG. 6. This step creates a layer of extra protective material that, as discussed below, may be configured to be positioned adjacent to an airbag cushion and to unfold during deployment to form a protective pocket for the airbag cushion during deployment.

Figure 7:
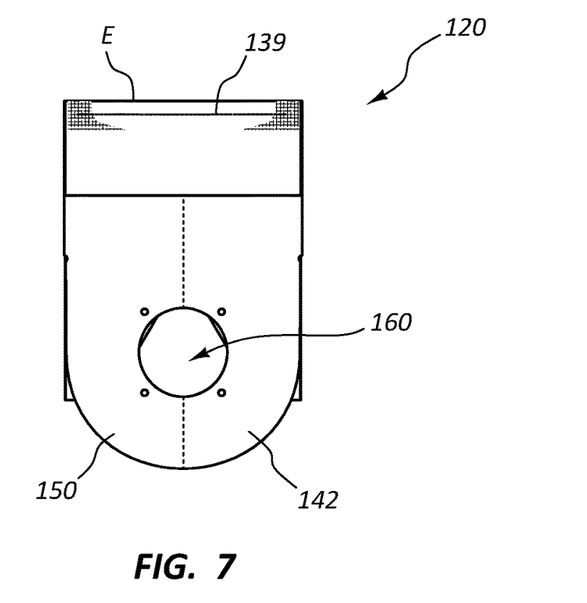

Following the folding step of FIG. 6, another sew line may be applied to protector 120 at 139, as depicted in FIG. 7. Sew line 139 may be applied near fold line E. For example, in some embodiments and implementations, sew line 139 may be at about the mid-point between fold line E and sew line D. Alternatively, sew line 139 may be positioned closer to fold line E than sew line D. Thus, for example, sew line 139 may be positioned at about the mid-point between the mid-point mentioned above (between fold line E and sew line D) and fold line E. Preferably, sew line 139 does not cross or extend beyond sew line D. Preferably, sew line 139, like sew line 137, also comprises a breakaway or tack sew to allow the sew to come loose during deployment of the accompanying airbag cushion.

Figure 8:
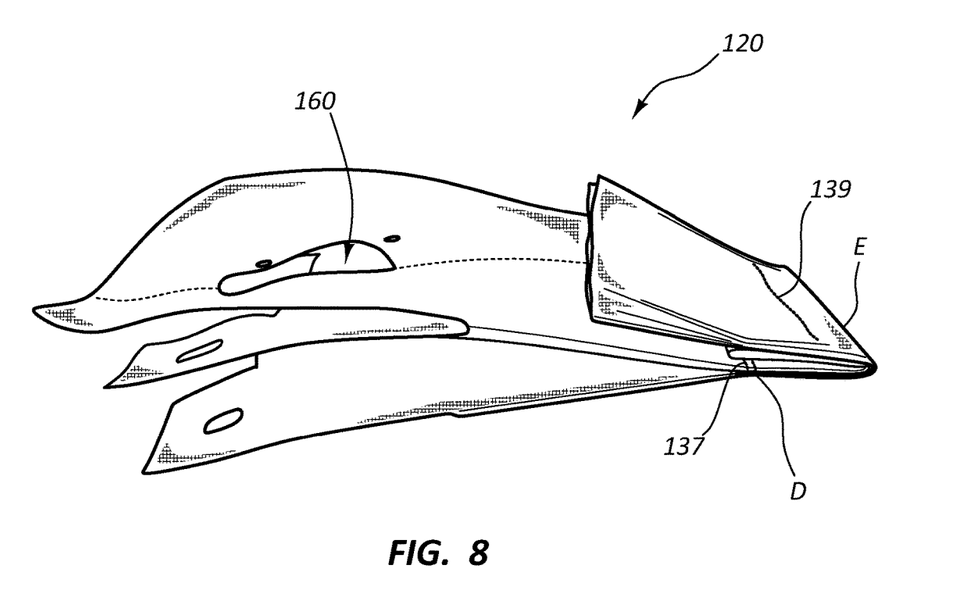
FIG. 8 is a side perspective view of the airbag cushion protector of FIGS. 3-7 following the assembly step of FIG. 7.

FIG. 8 is a side perspective view of airbag cushion protector 120 following the assembly step of FIG. 7. As depicted in this figure, a folded, layered portion of protector 120 is positioned at one end of the structure and a second portion comprising each of the coupling flaps is positioned at an opposite end of the structure.

Figure 9:
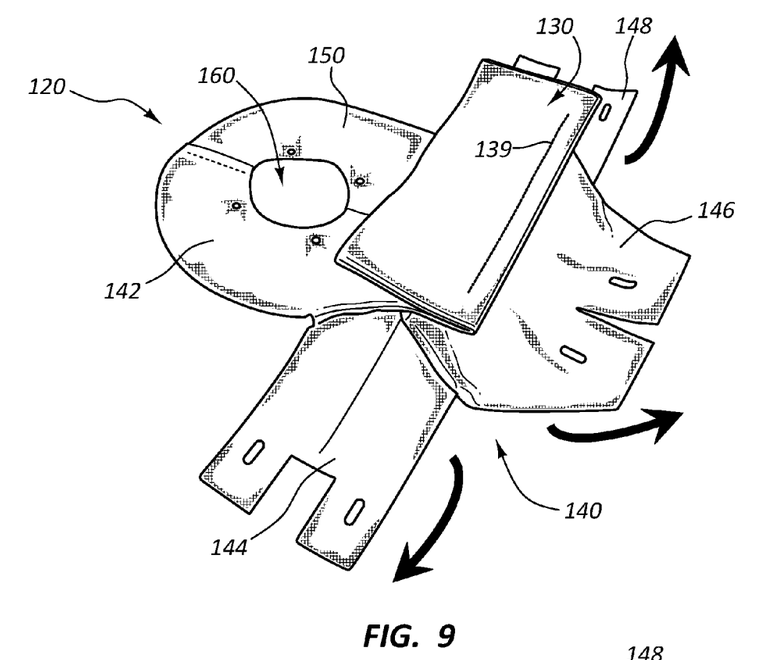
FIGS. 9-15 are perspective views of the airbag cushion protector of FIGS. 3-8 during various additional stages of a method of assembly.

FIGS. 9-15 are perspective views of airbag cushion protector 120 during various additional stages of a method of assembly. In FIG. 9, flaps 144, 146, and 148 are shown after having been pulled out from underneath the layered portion 130, as illustrated by the arrows in the figure. Flap 144 has been pulled out so that it extends in an opposite direction from flap 148 and flap 146 has been pulled out so that it extends in an opposite direction from flaps 142 and 150, which define opening 160.

Figure 10:
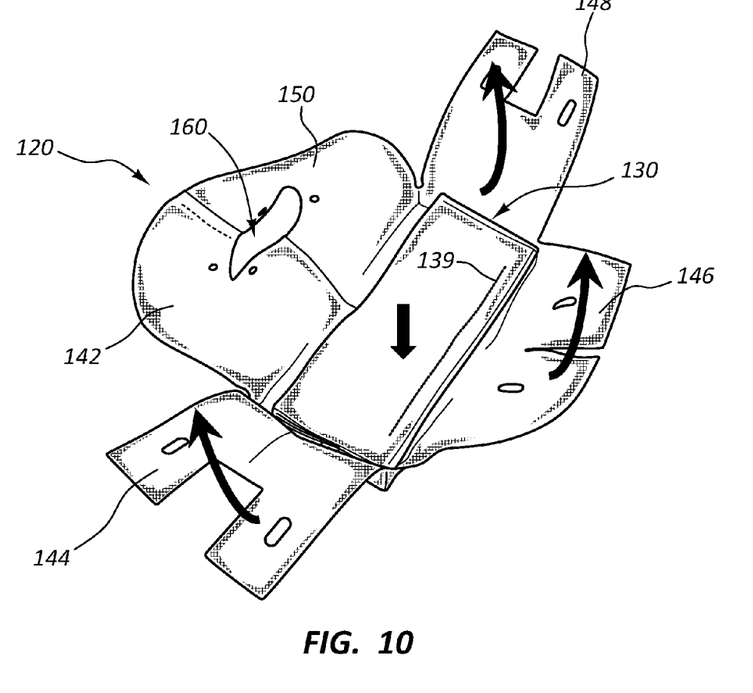

Following the step depicted in FIG. 9, the layered portion 130 that will ultimately define a protective pocket for an associated airbag cushion is pressed down, as illustrated by the central arrow in FIG. 10. In addition, each of the various flaps are pulled up so that portion 130 defines a seat for a pouch within which an airbag cushion may be received.

Figure 11:
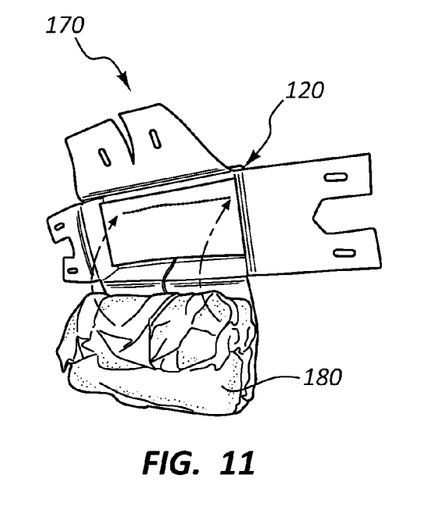
Figure 12:
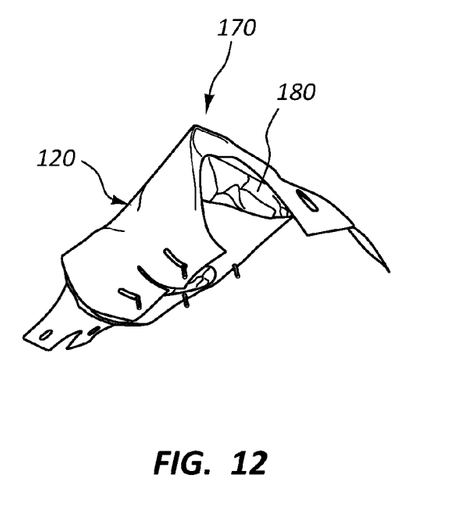
Figure 13:
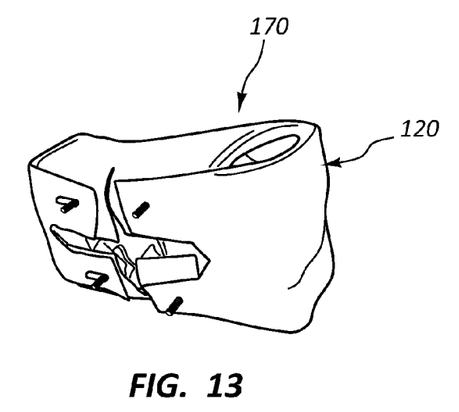
Figure 14:
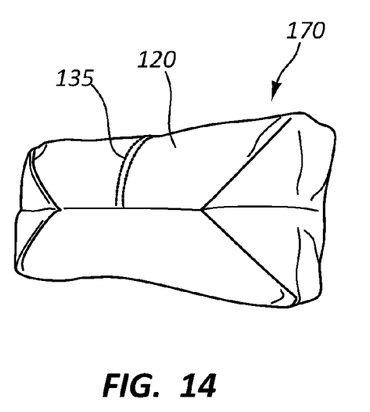
Figure 15:
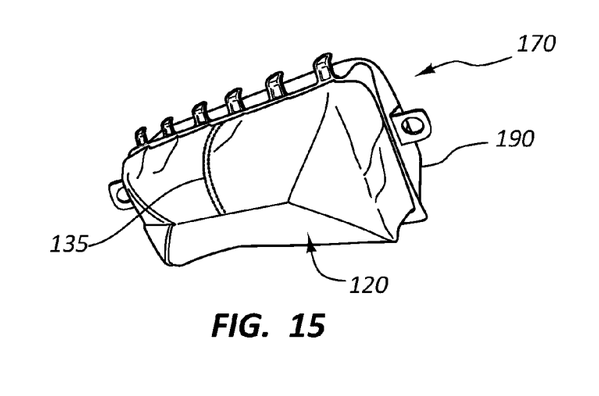

FIG. 11 depicts an airbag cushion 180 being inserted into this pouch. After inserting airbag cushion 180 into the pouch, each of the various flaps of protector 120 may be wrapped around airbag cushion 180 to enclose airbag cushion 180 therein, as depicted in FIG. 12 and FIG. 13. Thus, in the depicted embodiment, protector 120 may be considered a wrapper. Each of the fastener openings of the flaps of protector/wrapper 120 may receive a bolt or another fastener of an inflator, airbag housing, and/or airbag module, for example. Following the complete assembly of an airbag cushion assembly 170 comprising airbag cushion 180 and protector/wrapper 120, original sew line 135 ends up on the outside of protector/wrapper 120, as illustrated in FIG. 14. After full assembly of airbag cushion assembly 170, in some embodiments and implementations, assembly 170 may be inserted into an airbag module housing 190 such that assembly 170 comprises airbag cushion 180, protector 120, and housing 190, as illustrated in FIG. 15.

Figure 16:
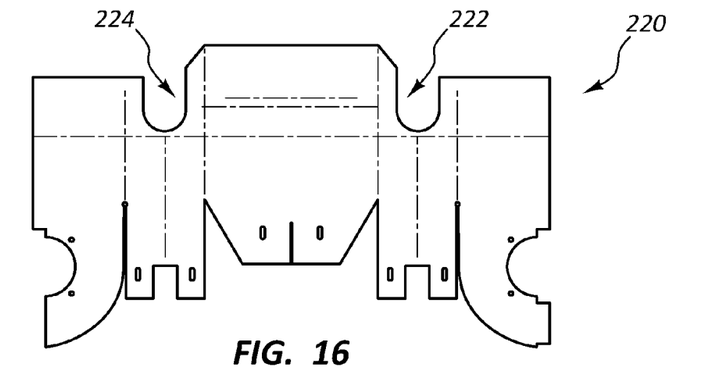
FIG. 16 is a plan view of an airbag cushion protector according to an alternative embodiment.

FIG. 16 is a plan view of an airbag cushion protector 220 according to an alternative embodiment. FIG. 16 illustrates protector 220 in an initial stage of assembly similar to that of protector 120 in FIG. 3. Thus, like protector 120, protector 220 preferably comprises a unitary piece of material having a desired pattern of flaps, fold lines, etc., as shown in FIG. 16. However, protector 220 comprises alternative notches 222 and 224. Notches 222 and 224 comprise U-shaped notches rather than V-shaped notches.

Figure 17:
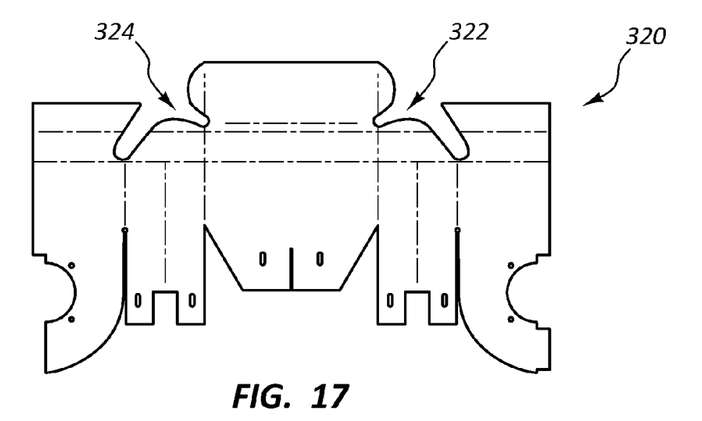
FIG. 17 is a plan view of an airbag cushion protector according to another alternative embodiment.

FIG. 17 is a plan view of an airbag cushion protector 320 according to another alternative embodiment. Protector 320 again comprises alternative notches 322 and 324. Notches 322 and 324 are configured to facilitate separation of protector 320 at two separate points along each notch. More particularly, since notches 322 and 324 both have two separate prongs or termini, the terminal point of each such prong may be configured to result in tearing/separation of protector 320 at such point.

Figure 18:
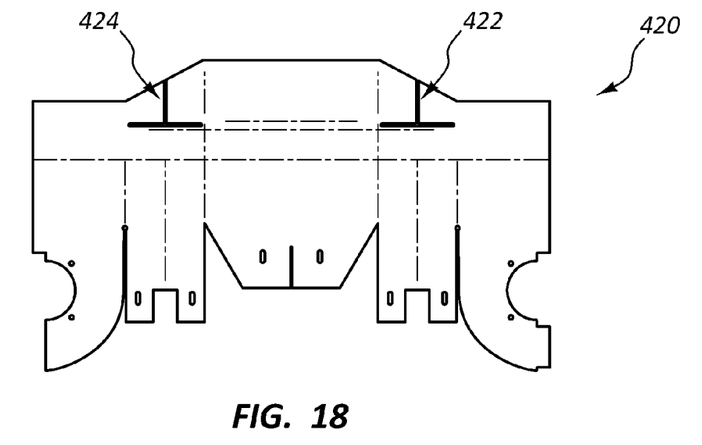
FIG. 18 is a plan view of an airbag cushion protector according to yet another alternative embodiment.

FIG. 18 is a plan view of an airbag cushion protector 420 according to yet another alternative embodiment. Protector 420 comprises slits 422 and 424. Slits 422 and 424 may be configured to facilitate desired protective functionality during unwrapping of protector 420 upon deployment of an associated airbag cushion. Although in the depicted embodiment of FIG. 18, slits 422 and 424 each have two portions angled with respect to one another, alternative embodiments are contemplated in which one or both of slits 422 and 424 may instead comprise a single cut or portion or slit portion. In the depicted embodiment, slits 422 and 424 may be configured to allow the pocket defined by protector 420 to expand without tearing along either portion of either of slits 422/424. However, with respect to other embodiments, the slits may be configured to facilitate tearing/separation of the airbag cushion protector during deployment. Notches 122, 124, 222, 224, 322, and 324, along with slits 422 and 424 are each examples of cuts that may be used to facilitate desired tearing and/or other deployment characteristics.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. An airbag cushion assembly, comprising:
   an airbag cushion; and
   a protective wrapper comprising a first portion and a second portion, wherein the first portion is wrapped around the airbag cushion, wherein the second portion is folded adjacent to a deployment side of the airbag cushion, wherein the protective wrapper is configured to expand upon deployment of the airbag cushion so as to define a pocket for protecting the airbag cushion during deployment by unfolding the second portion, and wherein the pocket is configured to enclose the airbag cushion about an entire perimeter of the airbag cushion during initial deployment.

2. The airbag cushion assembly of claim 1, wherein the second portion of the protective wrapper comprises a tear seam configured to sever upon deployment of the airbag cushion to allow the second portion to unfold.

3. The airbag cushion assembly of claim 1, wherein the protective wrapper comprises a unitary piece such that the first portion and the second portion are defined from a single piece of material.

4. The airbag cushion assembly of claim 1, wherein the protective wrapper further comprises opposing notches formed in the second portion, wherein the opposing notches are configured to facilitate tearing of the protective wrapper adjacent to the opposing notches during deployment.

5. The airbag cushion assembly of claim 4, wherein the opposing notches comprise v-shaped notches.

6. A vehicle, comprising:
an airbag deployment chute;
at least one door covering the airbag deployment chute;
an airbag cushion assembly positioned within the airbag deployment chute, the airbag cushion assembly comprising:
an airbag cushion; and
an airbag cushion protector coupled with the airbag cushion, wherein the airbag cushion protector is configured to expand upon deployment of the airbag cushion so as to define a pocket for protecting the airbag cushion during deployment, and wherein the pocket is configured to enclose the airbag cushion about an entire perimeter of the airbag cushion to prevent direct contact between the airbag cushion and the at least one door.

7. The vehicle of claim 6, wherein the airbag cushion protector is configured to expand during deployment by unfolding.

8. The vehicle of claim 6, wherein the pocket is further configured to prevent direct contact between the airbag cushion and any portion of a perimeter of the airbag deployment chute during deployment.

9. The vehicle of claim 6, wherein the pocket comprises a closed loop that defines an opening through which the airbag cushion can extend during deployment, and wherein the closed loop is configured to prevent direct contact between the airbag cushion and any portion of a perimeter of the airbag deployment chute during deployment.

10. The vehicle of claim 6, wherein the airbag cushion protector comprises a protective wrapper comprising a first portion and a second portion, wherein the first portion is wrapped around the airbag cushion, wherein the second portion is positioned adjacent to a deployment side of the airbag cushion, and wherein the airbag cushion is configured to extend through the second portion during deployment.

11. The vehicle of claim 6, wherein the airbag cushion protector comprises at least one cut configured to facilitate tearing of the airbag cushion protector adjacent to the at least one cut during deployment of the airbag cushion.

12. The vehicle of claim 11, wherein the at least one cut comprises at least one notch.

13. The vehicle of claim 11, wherein the airbag cushion protector comprises a first portion and a second portion, wherein the first portion is wrapped around the airbag cushion, wherein the second portion is positioned adjacent to a deployment side of the airbag cushion, wherein the airbag cushion is configured to extend through the second portion during deployment of the airbag cushion, and wherein the at least one cut extends along no more than about half of a height of the second portion from a perimeter of the pocket to a perimeter of the airbag deployment chute.

14. A method for assembly of an airbag cushion assembly, the method comprising the steps of:
coupling opposing portions of a protective wrapper together to define a tubular structure;
folding a first end of the tubular structure to create a layered portion, wherein the layered portion is configured to open during deployment of an associated airbag cushion to define a pocket for protecting the airbag cushion;
positioning the airbag cushion adjacent to the layered portion; and
coupling the airbag cushion to the protective wrapper.

15. The method of claim 14, further comprising forming at least one pleat along the tubular structure prior to the step of folding a first end of the tubular structure to create a layered portion.

16. The method of claim 15, wherein the step of forming at least one pleat along the tubular structure comprises:
forming a first pleat along a first side of the tubular structure; and
forming a second pleat along a second side of the tubular structure opposite from the first side.

17. The method of claim 14, further comprising forming a breakaway stitch to the layered portion, wherein the breakaway stitch is configured to open to expose the airbag cushion to the tubular structure during deployment of the airbag cushion.

18. The method of claim 14, wherein the pocket is configured to extend about an entire perimeter of the airbag cushion to prevent direct contact between the airbag cushion and a perimeter of an airbag deployment chute during deployment of the airbag cushion.

19. The method of claim 14, further comprising forming opposing notches along one end of the tubular structure, wherein the opposing notches are configured to facilitate separation of the protective wrapper adjacent to the opposing notches during deployment of the airbag cushion.

* * * * *